April 8, 1952 A. B. MAXAM 2,592,164
MODEL AIRPLANE WHEEL STRUCTURE
Filed Oct. 18, 1948
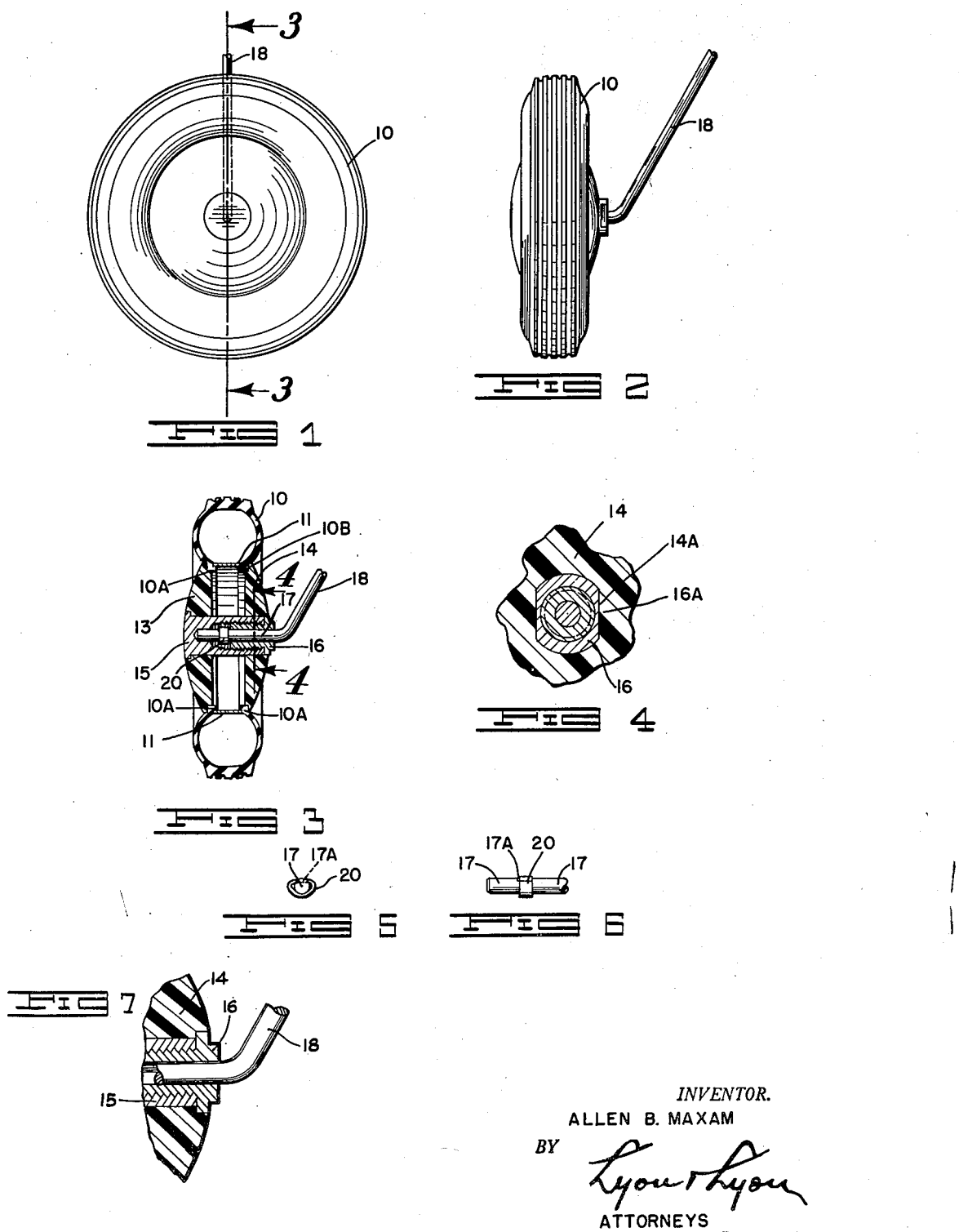
INVENTOR.
ALLEN B. MAXAM
BY
ATTORNEYS Patented Apr. 8, 1952

2,592,164

UNITED STATES PATENT OFFICE 2,592,164

MODEL AIRPLANE WHEEL STRUCTURE

Allen B. Maxam, Burbank, Calif.

Application October 18, 1948, Serial No. 55,057

4 Claims. (Cl. 301—63)

The present invention relates to an improved wheel construction for model airplanes and the like.

An object of the present invention is to provide an improved miniature wheel construction in which the component parts thereof may be readily assembled and disassembled to provide replacement thereof as the occasion may demand.

Another object of the present invention is to provide an improved miniature wheel construction, the component parts of which may be easily and conveniently assembled and disassembled without the use of heat such as required in soldering and welding, the advantages of which are obvious.

Yet another object of the present invention is to provide an improved miniature wheel construction characterized by the manner in which it may be easily assembled and disassembled and yet provide a pleasing appearance, when assembled.

Still another object of the present invention is to provide an improved miniature wheel construction, the component parts of which may be easily manufactured and assembled in accordance with present day mass production methods.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of a miniature wheel construction embodying the present invention.

Figure 2 is a view in side elevation of the same.

Figure 3 is a sectional view taken substantially in the direction indicated by the arrows 3—3 in Figure 1.

Figure 4 is a sectional view taken substantially in the direction indicated by the arrow 4—4 in Figure 3.

Figures 5 and 6 are detail views showing the manner in which a stop member may be mounted on the bent rod rotatably supporting the wheel.

Fig. 7 is a view showing, in enlarged form, a portion of the structure illustrated in Fig. 3.

The wheel construction shown in the drawings includes a miniature hollow tire 10 of the type found in automobiles and airplanes, modified so as to provide annular flanged portions 10A, 10B in the spaced beads of the tire within and against which a spacer ring 11 of sheet metal material is retained, not only by the inherent resiliency of the spaced beads of the tire 10, but also by the pair of oppositely disposed disk members 13 and 14 which clamp the spaced beads therebetween, using the two-part screw-threaded hub members 15, 16.

The female member 15 has an enlarged head which is recessed within the disk member 13 to make the outer surface of the wheel, as indicated in Figure 2, continuous and of pleasing appearance.

The inner male screw-threaded hub member 16 is apertured as a bearing to rotatably receive the axle 17 which is an extension of the bent rod 18. The rod 18 is in turn, attached to the model airplane in accordance with the conventional practice. The axle 17 is journalled not only in the inner hub member 16 but also its extreme outer end is journalled in the hub member 15, there being provided a bearing aperture in such member 15, for that purpose.

Axial movement of the axle 17 is prevented by the stop member 20 mounted on the axle 17. This stop member 20, as shown in Figures 5 and 6, may comprise simply a deformed tubular member entering a notched portion 17A in the axle 17. In assembling, the stop member 20 is placed on the axle 17 after the axle 17 is projected through the inner hub member 16.

In order to prevent relative movement between the hub 15, 16 and the disk members 13, 14, these hub members 15, 16 may be provided with flat surfaces as indicated by the flat surface 16A in Figure 4 cooperating with the adjacent flat surface 14A of the disk member 14.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a miniature wheel construction incorporating a hollow tire with spaced beads, a detachable spacer maintaining said beads in spaced relationship, a pair of relatively movable disk members engaging said beads and clamping said spacer and beads therebetween, a two-part hub member comprising two screw threaded parts engaging corresponding ones of said disk members for clamping said disks together with said beads between said disks and said spacer, with all the force developed between said two screw threaded parts being applied to said beads, said two-part hub member being provided with internal bearings in each part, an axle passing through each of said bearings, a pair of spaced surfaces on opposite ones of said hub members serving as stop members, and a stop member mounted on said axle adjacent the two parts of said hub member and cooperating with the aforesaid stop members to prevent undue longitudinal movement of the axle.

2. In a miniature wheel construction, a tire having its spaced inner beads recessed to resiliently and continuously engage the opposite circular edges of a circular ring of sheet metal which maintains said beads in spaced relationship, a pair of disks relatively movable with respect to each other to different adjusted positions, said disks each engaging opposite beads and clamping said ring member and beads therebetween with varying amounts of force, with all of such force between the disks applied to said beads, a pair of cooperating relatively movable screw threaded hub members each engaging a corresponding one of said disks, said disks being moved closer together in varying amounts upon relative movement between said pair of screw threaded cooperating hub members, an axle having portions thereof journaled in each pair of said hub members, said hub members having mutually spaced portions thereof serving as stop members, stop means on said axle cooperating with the aforementioned stop means to prevent objectionable longitudinal movement of said axle and each of said screw threaded hub members having means cooperating with corresponding disks for preventing relative movement therebetween.

3. In a minature wheel construction, a tire having its spaced inner beads adapted to resiliently engage a circular ring of sheet metal arranged to maintain said beads in spaced relationship, a pair of disks relatively movable with respect to each other to different adjusted positions, said disks each engaging opposite beads and arranged to clamp said ring member and beads therebetween with varying amounts of force, with all of such force between the disks applied to said beads, a pair of cooperating relatively movable screw threaded hub members, said disks being pressed together in varying amounts upon relative movement between said pair of screw threaded pair of cooperating hub members, an axle having portions thereof journaled in each of said pair of hub members, said hub members having mutually spaced portions thereof serving as stop members, and stop means on said axle cooperating with the aforesaid stop means to prevent objectionable longitudinal movement of said axle, said stop means on said axle comprising a deformed circular collar disposed in a groove in said axle.

4. The arrangement set forth in claim 1, in which said stop member on said axle comprises a deformed circular collar disposed in a groove in said axle.

ALLEN B. MAXAM.

REFERENCES CITED

The following references are of record in the file of this patent:

UNITED STATES PATENTS

| Number | Name | Date |
| --- | --- | --- |
| 101,097 | Clark | Mar. 22, 1890 |
| 1,414,594 | Snow | May 2, 1922 |
| 1,420,190 | Hardman | June 20, 1922 |
| 2,013,968 | McKee | Sept. 10, 1935 |
| 2,113,031 | Merz | Apr. 5, 1938 |

FOREIGN PATENTS

| Number | Country | Date |
| --- | --- | --- |
| 555,754 | Great Britain | Sept. 6, 1943 |